United States Patent [19]
Takeuchi

[11] Patent Number: 6,106,978
[45] Date of Patent: Aug. 22, 2000

[54] NON-AQUEOUS ELECTROLYTE SECONDARY CELL

[75] Inventor: Yoshiaki Takeuchi, Fukushima, Japan

[73] Assignee: Sony Corporation, Tokyo, Japan

[21] Appl. No.: 08/902,068

[22] Filed: Jul. 29, 1997

[30] Foreign Application Priority Data

Jul. 31, 1996 [JP] Japan .................................. 8-202181

[51] Int. Cl.[7] .................................................. H01M 4/80
[52] U.S. Cl. ................ 429/235; 429/231.8; 429/231.95; 429/233
[58] Field of Search ........................... 429/231.8, 231.95, 429/332, 233, 235

[56] References Cited

U.S. PATENT DOCUMENTS

5,601,950  2/1997  Yamahira et al. ...................... 429/218
5,824,120  10/1998  Mitchell et al. ...................... 29/623.1

*Primary Examiner*—Maria Nuzzolillo
*Assistant Examiner*—Angela Martin
*Attorney, Agent, or Firm*—Hill & Simpson

[57] ABSTRACT

An improved non-aqueous electrolyte cell according to this invention includes a negative electrode which is a composite sintered body of a carbonaceous sintered material retained on an expanded metal mesh collector. The expanded metal mesh has a sheet thickness T, a mesh long width center distance LW, a mesh short width center distance SW, a mesh long width maximum opening, a; and a mesh short width maximum opening, b, all carefully specified to obey predetermined conditions in order to provide improved secondary cells having high energy density. The expanded metal mesh collector has a specified configuration to prevent carbon layer cracking and/or separation of the carbon layer, caused by shrinkage of the carbon layer on sintering or by expansion/shrinkage of the carbon layer during charging and discharging, to secure stable cell characteristics.

8 Claims, 3 Drawing Sheets

NON-AQUEOUS ELECTROLYTE SECONDARY CELL

BACKGROUND OF THE INVENTION

1. Field of the Invention

This invention relates to a non-aqueous electrolyte secondary cell, especially to the improvement of the negative electrode collector thereof.

2. Prior Art

With the increased use of portable equipment such as video camera, radio cassette recorder and others, instead of expendable primary cells, the demand for rechargeable secondary cell is growing in the market.

Most of the secondary cells, available nowadays, are nickel-cadmium cells with alkaline electrolyte. However, on this kind of cells, there is a difficulty for increasing energy density as it's voltage is limited to about 1.2 volt. Also, this type of cell has a defect of 20% higher self-discharge rate under normal monthly temperatures.

On the other hand, there have been some proposals to use a non-aqueous solvent as electrolyte solution and to use light metal such as lithium for negative electrode. Such a non-aqueous electrolyte secondary cell, because of it's ultimate 3V or higher voltage, not only has a high energy density, but also maintains a low self-discharge rate.

However, even in such non-aqueous electrolyte secondary cells, there is a problem of short circuiting internally within the cell, which is caused by dendrite-like crystallizations of metal lithium in the negative electrode and is caused by the growth of the crystals until they finally form a contact with the positive electrode. This shortens cell life and is an obstacle for commercial use of these secondary cells.

For these reasons, the amalgamation of lithium with other metals in negative electrodes for non-aqueous electrolyte secondary cells has been considered. However, the alloys used for the negative electrodes are broken down into fine particles by repeated charging and discharging of the cells, which shortens cell life.

For this reason, a non-aqueous electrolyte secondary cell is disclosed in Japanese patent application laid-open publication No.62-90863, which provides a non-aqueous electrolyte secondary cell with carbonaceous materials such as coke and others as negative electrode active anode material. In this type of non-aqueous electrolyte secondary cell, doping and dedoping of lithium ions to/from the boundary area of the carbon layers or to/from the micropores of carbonaceous material is applied for cell reactions to eliminate the problem of lithium dendrite like crystal growth and atomization of negative electrode and to secure long cell life. As disclosed in Japanese patent application laid-open publication No.63-135099, when $Li_xMO_2$ (M denotes a transition metal or metals, x denotes $0.05 \leq x \leq 1.10$) is applied, especially good secondary cells are provided having extended use lives and higher energy densities.

However, in these non-aqueous electrolyte secondary cells, wherein a carbonaceous material is employed as a negative electrode active anode material, as compared to using metal lithium as a negative electrode active anode material, in spite of their better cycle life and safety, they are somewhat inferior in terms of their energy density.

One reason suggested for the observed inferiority in energy density is the use of a binder for binding the powdery carbonaceous material.

More particularly, in order to form an electrode from a powdery carbonaceous material, the addition of binder is required, at a ratio of about 10 to about 20% by weight for binding the powder to itself and to a collector. Although the organic binders are needed to obtain useful cycle life and safety, the binders do not directly contribute to cell charging and discharging. Accordingly, the addition of binder has a negative effect on cell capacity, proportional to the amount of binder used.

One method for solving such a problem is disclosed in Japanese patent application laid-open publications Nos. 6-150,908 and 7-288,126 and others. Instead of using binders, solid organic materials or pitch are used which, after being processed by heating, are carbonized to provide an active anode material retaining agent which participates in the reversible charging and discharging reactions of active anode material.

In accordance with these publications, a negative electrode is prepared from a mixture of a carbonaceous material, a solid organic material or pitch and the like and a solvent, which is painted on both sides of a metal collector and heated. During this heating process, the solid organic material or pitch is carbonized and sintered. The carbonized solid organic material functions to bind negative electrode carbonaceous materials and also has the ability to dope and de-dope lithium during charging and discharging to contribute to enhanced cell capacity.

The carbonized solid organic material is present three-dimensionally in the spaces between the particles of the carbonaceous material for the negative electrode. For this reason, in these sintered composite bodies, the binding agent does not represent a capacity loss, but instead serves to provide a durable, high energy density active anode for the secondary cell.

OBJECT AND SUMMARY OF THE INVENTION

The present invention has been accomplished in view of the aforementioned problems encountered in the prior art. The negative electrodes constituting composite sintered bodies of solid organic material or pitch still pose the following problems.

At first, in this negative electrode constituting sintered composite body, the solid organic materials or pitches and the like are carbonized. However, upon such carbonization, such carbon layer has a remarkable tendency to shrink. But, because of the intervention of the metal collector between the carbon layers, the metal collector hinders the uniform shrinkage of the carbon layers and as the result, cracking of the carbon layer or the separation of carbon layer from the metal collector takes place.

When such a cracked negative electrode is assembled into the cell, lithium deposits into the cracks and crystals of lithium grow forming dendrite-like crystals which induce internal short-circuiting of the cells. Sometimes, in the case of a partial separation of the carbon sintered layer, uniform electricity collection becomes impossible and cell performance becomes unstable.

Because these carbon layers do not include any binder, they lack in flexibility. For this reason, upon charging or discharging, the existence of the collector hinders the expansion and shrinkage of the carbon layer to bring about electrode cracking or the separation of the carbon layer from the collector because of the lowered adhesion between the carbon layer and the collector.

This present invention overcomes the problems associated with the prior art to prevent cracking or separation of the carbon layers in sintered composite body. A major advantage of this invention is that it provides a non-aqueous electrolyte secondary cell with high energy density and a stable cell characteristics.

Figure 1:
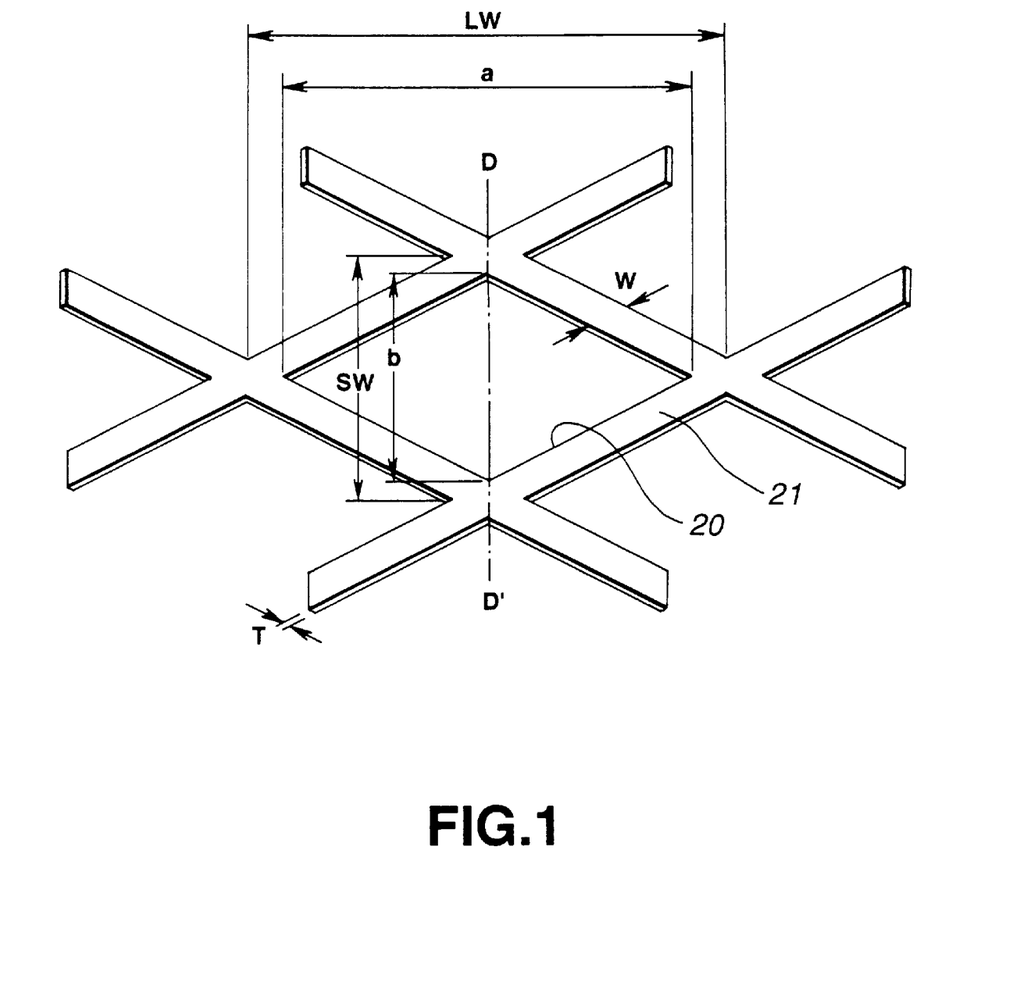
FIG. 1 is a perspective view showing an expanded metal mesh used in a sintered negative electrode in accordance with the present invention.

In accordance with these and other objects, the present invention provides a new and improved non-aqueous electrolyte secondary cell comprising a negative electrode, positive electrode and non-aqueous electrolyte. The solid negative electrode comprises a carbon sintered body including a collector of expanded metal made of a sheet metal having a thickness T (mm). The collector of expanded metal is provided in the form of a metal mesh with a plurality of shaped openings having dimensions including a mesh long width central distance LW (mm), a mesh short width central distance SW (mm), a mesh long width max. opening a (mm) and a mesh short width max. opening b (mm) as shown in FIG. 1. The aforementioned dimensions of the expanded metal mesh are characterized by satisfying the conditions specified below.

$0.05 \text{ mm} \leq T < 0.20 \text{ mm}$ $1.0 \leq (LW/SW) \leq 3.0$ $0.5 \text{ mm}_2 \leq (LW \times SW) \leq 12.5 \text{ mm}^2$ $0.43 \leq (a \times b)/(SW \times LW) \leq 0.90$ That is to say, in this non-aqueous electrolyte secondary cell, an expanded metal mesh is used as a collector of negative electrode sintered composite body. The expanded metal is sufficiently flexible to accomodate any expansion of the carbon layer caused by sintering as well as any expansion or shrinkage of the carbon layer caused by deformations occuring during charging and discharging. Especially, when the afore-mentioned parameters T, LW, SW, a, b satisfy the above-mentioned predetermined conditions, the collector shows excellent deformability to follow expansion and shrinkage of the carbon layer. At the same time, this configuration provides the collector with strength and provides the carbon layer with sufficient utility as an active anode material.

Due to aforementioned explanation of this invention, by applying the sintered composite body provided with a collector of expanded metal, it is possible to secure stable negative electrode performance without any cracking and separation of the carbon layer.

The non-aqueous electrolyte secondary cell according to this invention is explained hereinafter on it's detailed configuration with reference to the Drawings, in which:

DETAILED DESCRIPTION OF THE PREFERRED EMBODIMENTS

The non-aqueous electrolyte secondary cell according to this invention applies carbonaceous material as negative electrode activation material. The negative electrode is made up with a sintered composite body ,which is formed by retaining sintered carbon body by means of expanded metal body.

The aforementioned expanded metal body is used as a collector for the negative electrode. The expanded metal body is obtained by providing multiple cut or punched openings in a metal sheet and by pulling the sheet towards both sides. As shown in FIG. 1, the expanded metal has multiple rhombic openings (20) forming a mesh network.

Figure 2:
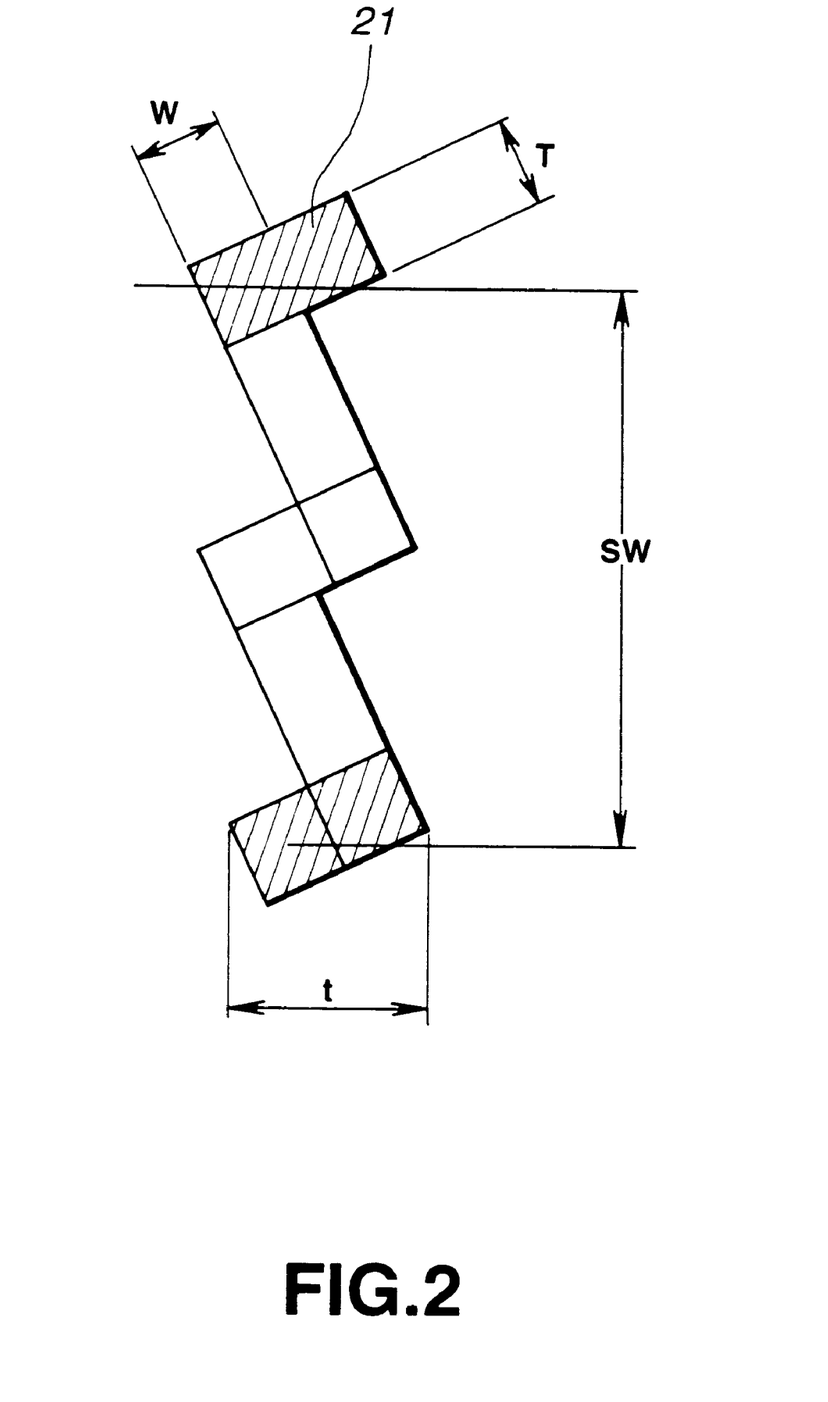
FIG. 2 is a cross-sectional view of the extended metal mesh collector as shown in FIG. 1.

FIG. 2 is a sectional view along D–D' line of the expanded metal shown in FIG. 1.

According to this invention, the expanded metal to be used as a collector is designed as specified hereunder.

Metal sheet thickness: T (mm)

Mesh (unit) long width center distance : LW (mm)

Mesh (unit) short width center distance : SW (mm)

Mesh max.(rhombic) opening: a (mm) (in LW direction)

Mesh max.(rhombic) opening: b (mm) (in SW direction)

and the design of the expanded metal is made to satisfy the conditions as specified in the next clause.

$0.05 \text{ mm} \leq T < 0.20 \text{ mm}$ $1.0 \leq (LW/SW) \leq 3.0$ $0.5 \text{ mm}_2 \leq (LW \times SW) \leq 12.5 \text{ mm}^2$ $0.43 \leq (a \times b)/(SW \times LW) \leq 0.90$ The mesh (unit) long center distance LW and the mesh (unit) short center distance is, respectively, a length of two diagonal lines of the sheet members constructing the expanded metal (mesh) rhombic opening, The former is a diagonal of the former longer one, the latter is a diagonal of the latter shorter one.

The purpose of using the expanded metal and of specifying the thickness T(mm), mesh (unit) long width center distance LW(mm), mesh (unit) short center distance SW(mm), mesh max.(rhombic) opening in LW direction a(mm), mesh max.(rhombic) opening in SW direction b(mm), is to enable the collector to accommodate deformations of the carbon layer including shrinkage upon sintering and expansion and shrinkage upon carbon layer charging and discharging. The collector helps to prevent cracking and/or separation of the carbon layer.

That is to say, the ratio of the mesh long width center distance LW to mesh short width center distance LW/SW is limited within the value of from about 1.3 to about 3.0. When the value of the ratio exceeds 3.0, aeolotropy takes place in the mesh deformation and the capability of expanded metal to follow to the expansion of carbon layer upon sintering and to the expansion and/or shrinkage upon charging and discharging may be lost and, as a result, cracking and/or separation of the carbon layer may take place.

It is required that the product of mesh (unit) long center distance LW and the mesh (unit) short center distance SW is within 0.5 up to 12.5 mm². When LW×SW is less than 0.5 mm$_2$, then the (rhombic) opening and expanded metal deformability become too small to flexiblty? adjust to carbon layer expansion upon sintering or carbon layer shrinkage or expansion upon the charging and discharging. When the value of LW×SW exceeds 12.5 mm², the (rhombic) opening is too large to lower the active anode material utilization rate at the center portion of the opening.

It is also required that the value of (a×b)/(SW×LW) is within the value of 0.43 up to 0.90. When the value of (a×b)/(SW×LW) is less than 0.43, the thickness of the mesh member becomes too large which decreases the mutual contact area of the carbon layers on both sides of the expanded metal, so that the adhesion becomes too weak. As a result, upon expansion and shrinkage upon the negative electrode sintering a separation of the carbon layer from the collector takes place. When (a×b)/(SW×LW) exceeds 0.96, the thickness of the mesh member becomes too small and the mesh strength becomes insufficient.

For this reason, the mesh becomes liable to break by the expansion and shrinkage of the carbon layer, the cell characteristics become unstable. In view of securing higher cell capacity, it is preferable to maintain (a×b)/(SW×LW) value over 0.6.

It is also required that, the thickness of the expanded metal be maintained between the value of 0.05 mm up to 0.02 mm. When the thickness of T is less than 0.05 mm, the mesh strength becomes too small. The mesh becomes liable to break by the expansion and shrinkage of the carbon layer during sintering and the cell characteristics become unstable. When the thickness is more than 0.2 mm, the mesh strength becomes too large and it becomes impossible for the expanded metal deformability to follow the carbon layer expansion and/shrinkage upon the carbon layer sintering, charging and discharging.

As the material for aforementioned expanded metal, the metals such as copper, nickel or iron and the like, which do not alloy with lithium are used. In view of maintaining a low internal electrical resistance within the cell and a high melting point, it is preferable to use copper or nickel.

As the solid organic material carbonizable by sintering, there are petroleum pitch, binder pitch, macromolecular resins, green coke and others, which contain some amount of resins. These materials may be used alone or in combination with other carbonaceous materials. As the carbonaceous materials to be mixed with aforementioned materials are, for instance, fully carbonized graphite, pyrocarbons, cokes (petroleum cokes, pitch cokes ), carbon blacks,(acetylene black etc), glassy carbons, organic macromolecular sintered body (organic macromolecular materials are carbonized by sintering in a inert gas or in vacuum under the temperature of 500 degree C. or higher), or carbon fibers and others. Also, it is possible to use the mixture of the aforementioned carbonaceous material to be mixed, for instance, with furan resin, divinylbenzen, polyfluorovinylidene, polychlorovinylidene or the like, as carbonaceous material in such case.

As material to be used for negative electrode, any material used in this kind of secondary cell is applicable, however, the carbon material cited hereunder is particularly recommended.

Carbon materials, which do not change into graphite even after being heat treated to approximately 3000 degree C., that is to say, graphitization resistant carbons are preferred. As the starting material for producing aforementioned graphitization resistant carbon materials. Furan resin made from homopolymers of furfurryl alcohol or furfural alcohol may be used. Because, the carbonaceous material made by carbonizing aforementioned Furan resins shows the extremely advantageous characteristics, that is to say, in which no oxidation peak was shown in the area over 700 degree C. detected by differential thermal analysis (DTA) under the conditions of over 0.37 nm (002) spacing, true density of lower than 1.70 g/cc.

Also, as another starting material, the organic material obtained by the introduction of functional groups including oxygen (so called oxygen cross link) into petroleum pitch having a special H/C atomic ratio is, as in the case of aforementioned Furan resin, in which a very favorable characteristics is shown upon carbonization, is recommended.

The aforementioned petroleum pitch is obtainable by the distillation, thermal polymerization and condensation, extraction, chemical polymerization and condensation etc of tars given by high temperature pyrolysis of coal tar, ethylene bottom oil, fuel oil and others and given by distilling asphalt and others. The distillation include vacuum distillation, normal temperature distillation, steam distillation. In such case, H/C atomic ratio is of the petroleum pitch is of much importance and, in order to obtain graphitization retardent carbons, the H/C atomic ratio should be maintained between from about 0.6 to about 0.8.

The actual methods for the introduction of said functional group containing oxygen into said petroleum pitch is not restricted. For instance, the wet method by using the aqueous solution of nitric acid, mixed acid, hypochlorous acid and others, the dry method by using oxidation gases (air, oxygen), and the method using solid reagents such as iron dichloride, sulfuric acid, ammonium nitrate, persulfuric ammonium may be used.

For instance, in case of the introduction of the functional group including oxygen into petroleum pitch by the method mentioned above, a final carbonaceous material is obtained in solid state without any melting in the process of carbonization (approx. 400 degree C.), as in the case of the process of graphitization retardent carbons.

By the aforementioned method of introducing oxygen into petroleum pitch for carbonization, a material for negative electrode is obtainable by carbonization regardless of any terms for carbonization. When the spacing (002)is more than 0.37 mm, true density is less than 70 g/cc and no oxidation heat peak is observed by differential thermal analysis (DTA) under the temperature exceeding 700 degree C. for the carbonization process for obtaining carbon material, so a negative electrode material of high lithium doping value can be obtained. For instance, by setting the condition of oxygen content of a precursor made by oxygen cross link processing petroleum pitch to be more than 10% by weight, it becomes possible to give the (002)spacing as of 0.37 nm or more to produced carbonaceous material. In this regard, the contained oxygen amount of said precursor should be more than 10% by weight, in spite of the fact of practice, the value is within the range of 10 up to 20%.

As an organic material for aforementioned oxygen cross link, the H/C atomic ratio of 0.6 up to 0.8 is acceptable. The aforementioned material is obtainable by making previous thermal treatment such as of the starting material such as changing into pitch to be applied for the process.

As such starting material, macromolecular organic compounds such as phenol resin, acrylic resin, vinyl halide resin, polyimide resin, polyamide imide resin, polyamide resin, conjugated system resin, cellulose and the derivatives and others, condensed multi-ring hydrocarbon compound such as naphthalene, phenanthrene, anthracene, triphenylene, pyrene, perillene, pentaphene, pentacene and the like, other derivatives (for instance, carbonic acid, carbonic acid anhydride, carbonic acid imide of such derivatives), pitches composed of aforementioned compounds, condensed heterocyclic compounds such as acenaphtilene, indole, isoindole, kynurine, isokynurine, quinoxaline, phtalozone, carbazole, acridine, phebasine, phentoriazine, and the derivatives of such compounds are also applicable.

When obtaining carbon material by using aforementioned organic materials, for instance, the materials are to be processed by carbonizing under 300 up to 700 degree C. at first, and sintered in a nitrogen atmosphere by the temperature raising speed of 1 up to 20 degrees per min. finally to 900 up to 1300 degrees C. for 0 up to 5 hours. Needless to say that the process of the carbonization be omitted when necessary.

Moreover, as negative electrode active anode material, a graphite carbon material may be used having a (002) spacing of less than 0.337 nm, and of the crystal thickness in the direction of C. axis of more than 16.0 nm, G value of Raman spectrum of more than 2.5, true density of more than 2.1 g/cm³ is excellent in electrode charging capability to obtain high cell capacity.

As a representative one of carbon material showing aforementioned physical parameters, natural graphite is excellent. Also, the artificial graphite treated in high temperature shows the aforementioned parameters. In order to obtain artificial graphite, it is necessary to conduct heat treatment of aforementioned carbon materials as precursor under the high temperature exceeding 2000 degree C.

Moreover, it is possible to use the powder of mesophase carbon, In such case, mesophase carbon powder is heat treated under the low temperature of approx. 300 degree C., among which some are further heat treated under the high temperature of approx. 900 degree C., until it changes into coke, both of the heat treated carbons are then mixed for using as the carbon layer material.

In order to construct the carbon layer by using the material, (1) such a powdery material is dispersed into a solvent to form a dispersant liquid and the liquid is painted on the expanded metal and pressure formed to conduct sintering. Or (2) this material powder is granulated and pressure formed together with the expanded metal to bring into sintering. In the latter (2) case, the wet type method using solvent or the wet type method without using any solvent, any method is acceptable for the purpose. Also, in the case of wet type method of granulation, the grains dried completely or the grains of semi-dried condition, or grains without drying, all types of such grain are acceptable.

The sintered composite body made of aforementioned material is preferably 0.2 up to 1.5 mm thickness. In the case of sintered composite body thickness of less than 0.2 mm, the electrode strength becomes insufficient to resist cracking of the carbon layer in case of the shrinkage upon assembly of the cell or upon sintering of the carbon layer or as may be caused by the expansion and shrinkage of the carbon layer during charging and discharging. When the thickness of the sintered composite body exceed 1.5 mm, the internal resistance of the cell increases unacceptably.

In this invention, aforementioned composite sintered body is used for negative electrode. As for the positive electrode and non-aqueous electrolyte, any type of product used generally in this type of non-aqueous secondary cell is acceptable.

More particularly, as an active cathode material for the positive electrode, for instance, the composite oxide expressed as $Li_xMO_2$ (M denotes a transition metal or metals, preferably Co, or Ni, Fe. Also x denotes $0.05 \leq x \leq 1.10$) may be used. As the active cathode materials, the composite oxides $LiCoO_2$, $LiNiO_2$, $LiNi_yCo_{(1-y)}$ (wherein, x denotes $0.05 \leq x \leq 1.10$, y denotes $0<y<1$) or $LiMn_2O_4$ are preferred.

These composite oxides are obtained by mixing some carbonates of lithium, cobalt, nickel and others according to the composition of the aimed compound, and then, by sintering them under the oxygen rich atmosphere of 900 degree C. The starting materials are not limited to carbonates, but may also include hydrates, oxides and others.

The non-aqueous electrolyte comprises a solution of a lithium salt as electrolyte in an organic solvent.

As aforementioned organic solvent, ring-chain esters such as propylene carbonate, ethylene carbonate, gamma-butyrolactone, butylene carbonate, vinylene carbonate and the like, the chain compound ester such as 1,2-dimethoxyethane 2,3-dimethyl-1,3-diox?, methyl propionic acid, methyl butyric acid ? methyl, dimethyl carbonate, diethyl carbonate, dipropylene may be used.

Such organic solvents can be used independently or as a mixture with other solvents. Especially, by mixing ring-chain ester and chain compound ester, the low temperature characteristic of the solvent may be improved.

Also, as electrolyte, lithium peroxide, lithium boride fluoride, lithium phosphide fluoride, lithium aluminate chloride, lithium halide, lithium trifluoromethane sulfonic acid may be used.

DETAILED DESCRIPTION OF THE INVENTION

EXAMPLES

Hereinafter, the embodiments according to this invention are explained according to experiments.

EXAMPLE 1

Figure 3:
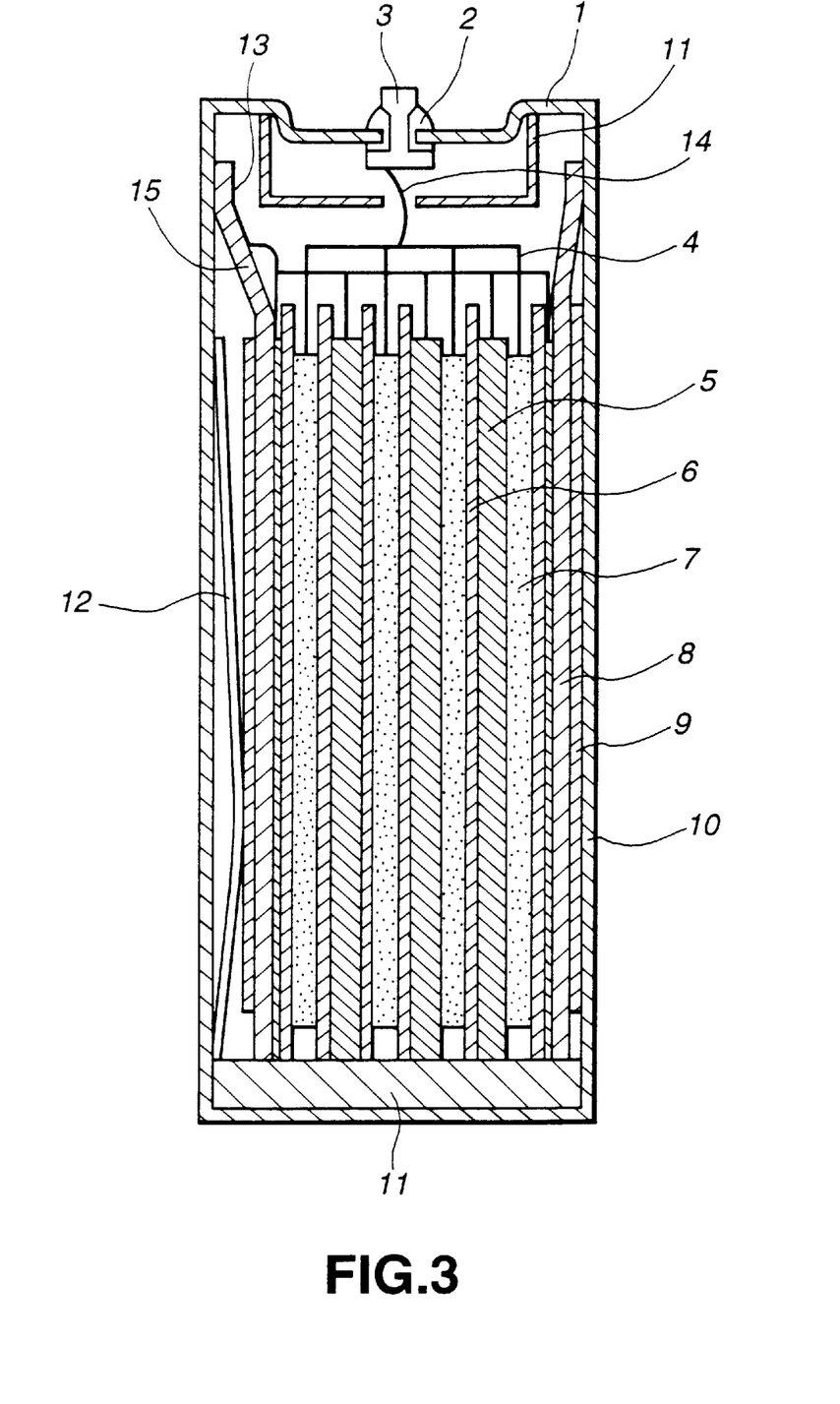
FIG. 3 is a longitudinal cross-sectional view of a non-aqueous electrolyte secondary cell in accordance with the present invention.

FIG. 3 shows an example of the square type cell according to this invention. Such a square type cell is made as follows.

At first, the positive electrode is made as follows.

In order to synthesize positive electrode active cathode material ($LiCoO_2$), lithium carbonate and cobalt carbonate are mixed by the ratio of Li/Co (mol)=1. Then the mixture was sintered in the air at a temperature of 900 degree C. for 5 hours. By making the X ray diffraction measurement on obtained product, the result proved that the it is identical with $LiCoO_2$ specified in JCPDS card. The obtained product $LiCoO_2$ was pulverized to a powder by using automatic mortar. The average grain diameter of the $LiCoO_2$ powder obtained was 10 micrometers.

As next process, the $LiCoO_2$ 91 weight percent, ketchen black 3 weight percent, polyfluorovinyliden 2.5 weight percent are mixed, and finally, dimethylformamide was added as disperse medium to produce positive electrode material slurry. Then the positive electrode material slurry was dried by means of spray drier for organic solvent (Sakamoto Giken) under 150 degree C. wind to make almost spherical fine powder of average 100 micro meter. The powder for positive electrode was formed to square shape with aluminum mesh (positive electrode collector) to complete a 39.5 mm×31.0 mm flat square positive electrode 7. The volume density d of the composed material for positive electrode is 3.1 g/ml.

Then, negative electrode composite sintering body 5 was made as follows.

250 mesh under mesofuse low expansion type carbon powder (Osaka Kasei Co Ltd : product name LEC-1) (fixed carbon: 88.5%,total expansion rate measured by dilatometer used for measuring coal : 0%) was heat treated for one hour under 300 degree C. to obtain the powder of average grain size of 20 micro meter. The powder obtained here is called carbon powder A.

Moreover, aforementioned carbon powder A and other carbon powder B are mixed by the ratio of 70:30 (weight), then to the mixed carbon powder, polyvinyl alcohol (molecular weight 500) as binder, and water. Then they were kneaded to make negative electrode material. The negative electrode materials were granulated and screened to adjust the grain size within 150 up to 250 micrometer.

The aforementioned grains are, together with copper mesh (expanded metal), pressure formed to form square form by 1 up to 5 tons force. And the mesh including electrode was, with flat carbon plate on both sides, heat treated in a inert gas atmosphere and under 1000 degree C. temperature to make 39.5 mm×31.0 mm negative electrode composite sintered body. The polyvinyl alcohol admixed to aforementioned carbon mixture powder was volatilized and removed. The dimensions of the copper mesh used as collector are as follows.

Metal sheet thickness T mm : 0.05 mm
Mesh (unit) long width center distance LW mm : 1.50 mm
Mesh (unit) short width center distance SW mm : 0.75 mm
Mesh max.(rhombic) opening a (mm) (in LW direction) : 1.35 mm
Mesh max.(rhombic) opening b (mm) (in SW direction) : 0.6 mm In the produced negative electrode composite a sintered body 5, the volume density of carbon layer is 1.25 g/ml, and the true specific weight is 1.75/ml.

Five pieces of aforementioned negative electrode composite sintered body and 4 pieces of positive electrode were with the intervention of separators 6 made of micro-cellular polyethylene film, respectively, laminated. Upon such case, the outmost side of the sheet was negative electrode composite sintered body. The thickness of such outmost negative electrode sintered bodies are 0.38 mm, the thickness of other negative electrode composite sintered-body are 0.76 mm. Then by using 40 mm width adhesive tape 9, the end portion s are fixed to form electrode laminated body element.

Then, in the iron cell box 10 provided with nickel plating, together with spring plate 12, aforementioned electrode laminated body was accommodated. In such case, on both of upper and lower sides of said laminated body, insulation sheet 11 were provided. Then, for the electric collection of negative electrode, the end of copper negative electrode lead 13 were pressure connected to the electrode 13 and via collectors 8 and 15 the other electrode end were connected with cell box 10 by welding. Also, for the electric connection from positive electrode, one end of positive electrode lead 4 made of aluminum is, via the aluminum subhead 14, connected to positive electrode terminal 3 is secured by sealing gasket 2 in cell box lid 1. The other end of it is interrupted corresponding to cell inner pressure, and was welded by laser to cell box lid 1 provided with safety device having cleavage valve.

Then, into aforementioned cell box, the electrolyte consisting of the mixture solvent of propylene carbonate 50% volume and diethyl carbonate 50% volume added by LiPF 6 1 mol was poured. Then, cell box lid 1 is closed by welding to form a square type cell of 8 mm thickness, height 48 mm, and width 34 mm.

EXAMPLE 2, 3

The thickness T of the copper mesh used as negative electrode collector is modified as shown in FIG. 1. Other configuration is identical with the embodiment as shown in Example 1 to construct square type cell.

COMPARATIVE EXAMPLE 1–3

The thickness of copper mesh used as negative electrode was modified as shown in Table 1 . Other configurations are identical with those of Example 1 to construct square type cell of this invention.

As for the cells made according to aforementioned process, cell inner electrical resistance, discharge capacity, capacity maintaining rate, and the change of cell appearance after discharge cycles were investigated.

DISCHARGE CAPACITY

Within the scope of 2.5 V up to final voltage 4.25 V under charging ampere 400 mA, constant current charge was conducted. Thereafter, by charge current 200 mA or 400 mA constant current discharge was conducted up to final voltage 2.5 V. The discharge capacity was measured under this discharge 200 mA condition, and respectively discharge 400 mA condition.

CHARGE & DISCHARGE CYCLE

After the constant current charge from 2.5 V up to final voltage 4.25 V, under charge current 400 mA a constant current discharge up to final voltage 2.5 V by discharge current 200 mA was conducted. Such a cycle was repeated 50 times to measure the ratio of initial capacity to th discharge capacity upon final 50 th discharge.

CELL APPEARANCE

Immediately after the sintering, the appearance of negative composite sintered body was observed. Then after repeating charge-discharge cycle of 50 times, the cell was dismantled and the appearance of negative electrode composite sintered body was observed.

The results of above investigation are shown in Table 1 and Table 2.

TABLE 1

| | Material | Sheet Metal Thickness | LW (mm) | SW (mm) | a (mm) | b (mm) |
|---|---|---|---|---|---|---|
| Example 1 | Copper | 0.05 | 1.5 | 0.75 | 1.35 | 0.60 |
| Example 2 | Copper | 0.1 | 1.5 | 0.75 | 1.35 | 0.60 |
| Example 3 | Copper | 0.15 | 1.5 | 0.75 | 1.35 | 0.60 |
| Comparative Example 1 | Copper | 0.03 | 1.5 | 0.75 | 1.35 | 0.60 |
| Comparative Example 2 | Copper | 0.2 | 1.5 | 0.75 | 1.35 | 0.60 |
| Comparative Example 3 | Copper | 0.3 | 1.5 | 0.75 | 1.35 | 0.60 |

| | LW/SW | LW × SW (mm$^2$) | (a × b)/(LW × SW) | Electrode Appearance (After Sintering) |
|---|---|---|---|---|
| Example 1 | 2 | 1.125 | 0.72 | Good |
| Example 2 | 2 | 1.125 | 0.72 | Good |
| Example 3 | 2 | 1.125 | 0.72 | Good |
| Comparative Example 1 | 2 | 1.125 | 0.72 | Good |
| Comparative Example 2 | 2 | 1.125 | 0.72 | Cracked |
| Comparative Example 3 | 2 | 1.125 | 0.72 | Cracked |

TABLE 2

| | Cell Inner Electrical Resistance (me) | 200 mA Discharge Capacity (mAh) | 400 mA Discharge Capacity (mAh) |
|---|---|---|---|
| Example 1 | 72 | 975 | 855 |
| Example 2 | 60 | 960 | 860 |
| Example 3 | 57 | 945 | 865 |

TABLE 2-continued

| | | | |
|---|---|---|---|
| Comparative Example 1 | 78 | 985 | 840 |
| Comparative Example 2 | 55 | 930 | 840 |
| Comparative Example 3 | 50 | 900 | 800 |

| | Capacity Maintain Rate after 50 cycles (%) | Electrode Appearance (After 50 cycles) |
|---|---|---|
| Example 1 | 95 | Good |
| Example 2 | 96 | Good |
| Example 3 | 95 | Good |
| Comparative Example 1 | 90 | Partially Separated |
| Comparative Example 2 | 89 | Cracked Partially Separated |
| Comparative Example 3 | 75 | Li Deposited at Cracking |

As shown in Table 1 and Table 2, the thickness T of negative electrode collector was modified from over 0.05 mm up to 0.20 mm. The cell of the Example 1–3 maintains good negative electrode condition even after 50 cycles to prove excellent cell characteristics.

Notwithstanding, in case of the case of copper mesh thickness less than 0.05 mm(comparative example 1), the copper mesh strength is too small and brings about breakage of copper mesh by the shrinkage of carbon layer upon forming pressure or sintering, or the expansion and shrinkage upon charge and discharge. As the result cell characteristics becomes unstable.

Also, in case of the copper mesh thickness T more than 0.2 mm (comparative example 2,3), the strength of copper mesh is too big, which makes the copper mesh too rigid to accommodate the carbon layer shrinkage upon sintering, and to the expansion and shrinkage of upon charging and discharging. This hinders the shrinkage of carbon layer hindered by copper mesh to bring about the cracking and separation of carbon layer. The cells with the electrode having such a cracking or separation brings about the inner electrical short circuit because of the deposition of lithium into such cracking brought by such charging and discharging and the growth of dendrite like crystals.

For this reason, in order to prevent carbon layer cracking and separation, the thickness T of expanded metal used as negative electrode collector is preferably more than 0.05 mm up to 0.20 mm.

EXAMPLE 4–10

As for the copper mesh used as negative electrode collector, sheet metal thickness T, mesh long width central distance LW, mesh short width central distance SW, mesh long width max. opening a and mesh short width max. opening b are modified as shown in FIG. 3. Other configurations are identical as mentioned above to construct square type cells as in the case shown in FIG. 1.

COMPARATIVE EXAMPLE 4–6

As for the copper mesh used for negative electrode collector, sheet metal thickness T, mesh long width central distance LW, mesh short width central distance, mesh long width max. opening a, mesh short width max. opening are modified as shown in Table 3, that is to say, LW/SW or LW×SW are deleted from the specified scope. Other configurations are identical as in the case of example 1 to make square type cells.

As for the cells made by aforementioned process, evaluations are made on cell inner electrical resistance, discharge capacity, capacity maintaining rate, and the change of the appearance after charge and discharge cycles. The result of the evaluation is shown in Table 3 and Table 4.

TABLE 3

| | Material | Sheet Metal Thickness | LW (mm) | SW (mm) | a (mm) | b (mm) |
|---|---|---|---|---|---|---|
| Example 4 | Copper | 0.1 | 1 | 1 | 0.85 | 0.85 |
| Example 5 | Copper | 0.1 | 1 | 0.5 | 0.85 | 0.35 |
| Example 6 | Copper | 0.1 | 2 | 1 | 1.85 | 0.85 |
| Example 7 | Copper | 0.1 | 3 | 1 | 2.85 | 0.85 |
| Example 8 | Copper | 0.1 | 3 | 1.5 | 2.85 | 1.35 |
| Example 9 | Copper | 0.1 | 3 | 2 | 2.85 | 1.85 |
| Example 10 | Copper | 0.1 | 5 | 2.5 | 4.80 | 2.30 |
| Comparative Example 4 | Copper | 0.1 | 5 | 3 | 4.80 | 2.80 |
| Comparative Example 5 | Copper | 0.1 | 6 | 3 | 5.80 | 2.80 |
| Comparative Example 6 | Copper | 0.1 | 4 | 1 | 3.85 | 0.85 |

| | LW/SW | LW × SW ($mm^2$) | (a × b)/ (LW × SW) | Electrode Appearance (After Sintering) |
|---|---|---|---|---|
| Example 4 | 1 | 1 | 0.72 | Good |
| Example 5 | 2 | 0.5 | 0.60 | Good |
| Example 6 | 2 | 2 | 0.79 | Good |
| Example 7 | 3 | 3 | 0.81 | Good |
| Example 8 | 2 | 4.5 | 0.86 | Good |
| Example 9 | 1.5 | 6 | 0.88 | Good |
| Example 10 | 2 | 12.5 | 0.88 | |
| Comparative Example 4 | 2 | 15.0 | 0.90 | Good |
| Comparative Example 5 | 2 | 18.0 | 0.90 | Good |
| Comparative Example 6 | 4 | 4 | 0.82 | Good |

TABLE 4

| | Cell Inner Electrical Resistance (mΩ) | 200 mA Discharge Capacity (mAh) | 400 mA Discharge Capacity (mAh) |
|---|---|---|---|
| Example 4 | 58 | 945 | 865 |
| Example 5 | 55 | 935 | 870 |
| Example 6 | 64 | 970 | 870 |
| Example 7 | 66 | 980 | 880 |
| Example 8 | 70 | 990 | 890 |
| Example 9 | 74 | 1005 | 895 |
| Example 10 | 76 | 1020 | 880 |
| Comparative | 80 | 1020 | 870 |

TABLE 4-continued

| | | | |
|---|---|---|---|
| Example 4 | | | |
| Comparative Example 5 | 84 | 1025 | 840 |
| Comparative Example 6 | 68 | 995 | 865 |

| | Capacity Maintain Rate after 50 cycles (%) | Electrode Appearance (After 50 cycles) |
|---|---|---|
| Example 4 | 96 | Good |
| Example 5 | 96 | Good |
| Example 6 | 96 | Good |
| Example 7 | 95 | Good |
| Example 8 | 95 | Good |
| Example 9 | 94 | Good |
| Example 10 | 92 | Good |
| Comparative Example 4 | 88 | Partially Separated |
| Comparative Example 5 | 87 | Partially Separated |
| Comparative Example 6 | 86 | Cracked |

As is observed from Table 3 and table 4, in the example 4 up to 10 of the cell, wherein LW/SW was 1.0 up to 3.0, LW×SW was specified to 0.5 up to 12.5 mm$^2$, the negative electrode maintains good acceptable conditions even immediately after sintering and after 50 charging/discharging repetitions and maintains a good cell characteristics.

Notwithstanding, in case of copper mesh LW/SW ratio exceeding 3 (comparative example 6), a cracking takes place by the expansion and shrinkage of carbon layer upon charging and discharging. That is to say, as to the copper mesh, upon which the ratio of LW (mesh long width center distance) and SW (mesh short width center distance) there is anisotropy upon deformation, by which there occurs unevenness of deformation following to the carbon layer expansion and shrinkage.

On the other hand, when LW×SW exceeds 12.5 mm$^2$ (comparative example 4,5) the cell characteristics presents extreme instability. This is because of large opening and because of less utility at the center of the opening. Especially, when LW×SW value is 18.0 mm$^2$, the carbon layer is lost by separation upon charging and discharging.

From aforementioned facts, in order to control carbon layer cracking and separation for obtaining good electrical characteristics, as for expanded metal used as negative electrode collector, mesh long width center distance LW and mesh short width center distance SW, the ratio LW/SW be 1.0 up to 3.0, LW×SW be settled 0.5 up to 12.5 mm$^2$.

EXAMPLE 11–15

As for the copper mesh used as negative electrode collector, the sheet metal thickness T, mesh long width center distance LW, mesh short width center distance SW, mesh long width max. opening a and mesh short width max. opening b are modified as shown in table 5. Other configurations are identical to EXAMPLE 1 to make square type cell.

COMPARATIVE EXAMPLE 7,8

As for copper mesh used as negative electrode collector, sheet metal thickness T, mesh long width center distance LW, mesh short width center distance LW, mesh long width max. opening a, mesh short width max. opening b are modified as shown in Table 5, that is to say, (a×b)/(LW×SW) is excluded from requirement. Another configuration of the cell is identical to aforementioned example 1 to make square type cells.

AS for the cells processed as mentioned above, cell inner electrical resistance, discharge capacity, capacity maintaining rate, electrode appearance after charge discharge cycle are evaluated as shown in Tables 5 and 6 below:

TABLE 5

| | Material | Sheet Metal Thickness | LW (mm) | SW (mm) | a (mm) | b (mm) |
|---|---|---|---|---|---|---|
| Example 11 | Copper | 0.1 | 2 | 1 | 1.55 | 0.55 |
| Example 12 | Copper | 0.1 | 2 | 1 | 1.60 | 0.60 |
| Example 13 | Copper | 0.1 | 2 | 1 | 1.70 | 0.70 |
| Example 14 | Copper | 0.1 | 3 | 2 | 2.85 | 1.85 |
| Example 15 | Copper | 0.1 | 3 | 2 | 2.88 | 1.88 |
| Comparative Example 7 | Copper | 0.1 | 2 | 1 | 1.50 | 0.50 |
| Comparative Example 8 | Copper | 0.1 | 4 | 2 | 3.88 | 1.88 |

| | LW/SW | LW × SW (mm$^2$) | (a × b)/ (LW × SW) | Electrode Appearance (After Sintering) |
|---|---|---|---|---|
| Example 11 | 2 | 2 | 0.43 | Good |
| Example 12 | 2 | 2 | 0.48 | Good |
| Example 13 | 2 | 2 | 0.60 | Good |
| Example 14 | 1.5 | 6 | 0.88 | Good |
| Example 15 | 1.5 | 6 | 0.90 | Good |
| Comparative Example 7 | 2 | 2 | 0.38 | Partially Separated |
| Comparative Example 8 | 2 | 8 | 0.91 | Good |

TABLE 6

| | Cell Inner Electrical Resistance (mΩ) | 200 mA Discharge Capacity (mAh) | 400 mA Discharge Capacity (mAh) |
|---|---|---|---|
| Example 11 | 55 | 930 | 875 |
| Example 12 | 57 | 940 | 875 |
| Example 13 | 60 | 950 | 874 |
| Example 14 | 74 | 1005 | 900 |
| Example 15 | 78 | 1010 | 895 |
| Comparative Example 7 | 55 | 925 | 860 |
| Comparative Example 8 | 82 | 1015 | 860 |

| | Capacity Maintain Rate after 50 cycles (%) | Electrode Appearance (After 50 cycles) |
|---|---|---|
| Example 11 | 94 | Good |
| Example 12 | 95 | Good |
| Example 13 | 95 | Good |
| Example 14 | 95 | Good |
| Example 15 | 94 | Good |
| Comparative Example 7 | 89 | Partially Separated |
| Comparative Example 8 | 90 | Cracked |

As for the copper mesh as negative electrode collector, in the cell of Examples 11–15, wherein (a×b)/(LW×SW) is within the scope of 0.43 up to 0.90, the negative electrode maintains good condition even immediately after sintering and after 50 times charging and discharging, a good electrical characteristics are maintained.

Notwithstanding, in the case (comparative example 7), wherein (a×b)/(LW×SW) is less than 0.43, the carbon layer separates from the metal mesh by the shrinkage of carbon layer sintering and the expansion and shrinkage of the carbon layer. When (a×b)/(LW×SW) is less than 0.43,the ratio of the area of mesh opening becomes too small, because the adhesive contact area between the carbon layers on both sides of the mesh becomes also too small to lower the adhesive force.

In case, (a×b)/(SW×LW) exceeds 0.94, (comparative example 8), the copper mesh becomes too fine to bring about the breakage of copper mesh upon carbon layer forming or sintering or discharging, the cell characteristics become unstable.

For this reason, to control carbon layer cracking and separation and to prevent carbon layer separation, in order to obtain good cell electrical characteristics, it is required to specify copper mesh sheet metal thickness T and LW/SW and LW×SW within predetermined range and to specify (a×b)/(SW×LW) within 0.43 up to 0.90. In view of increasing cell capacity, (a×b)/(LW×SW) is preferably more than 0.6.

EXAMPLE 16–18

The square type cell was made by the same process as example 1 except using the metal mesh as negative electrode shown in Table 7. The metal mesh thickness T, mesh long width center distance LW, mesh short width center distance SW, mesh long width max. opening a, mesh short width max. opening b are same as of the copper mesh used in example 2.

On the cell made by aforementioned process, cell inner electrical resistance, discharge capacity, capacity maintaining rate, change of the electrode appearance after charge discharge cycle were evaluated. Tables 7,8 show the result.

TABLE 7

| | Material | Sheet Metal Thickness | LW (mm) | SW (mm) | a (mm) | b (mm) |
|---|---|---|---|---|---|---|
| Example 16 | Copper | 0.1 | 1.5 | 0.75 | 1.35 | 0.60 |
| Example 17 | Nickel | 0.1 | 1.5 | 0.75 | 1.35 | 0.60 |
| Example 18 | SUS | 0.1 | 1.5 | 0.75 | 1.35 | 0.60 |

| | LW/SW | LW × SW (mm$^2$) | (a × b)/ (LW × SW) | Electrode Appearance (After Sintering) |
|---|---|---|---|---|
| Example 16 | 2 | 1.125 | 0.72 | Good |
| Example 17 | 2 | 1.125 | 0.72 | Good |
| Example 18 | 2 | 1.125 | 0.72 | SUS Melting |

TABLE 8

| | Cell Inner Electrical Resistance (mΩ) | 200 mA Discharge Capacity (mAh) | 400 mA Discharge Capacity (mAh) |
|---|---|---|---|
| Example 16 | 60 | 960 | 860 |
| Example 17 | 90 | 960 | 850 |
| Example 18 | 125 | 960 | 845 |

| | Capacity Maintain Rate after 50 cycles (%) | Electrode Appearance (After 50 cycles) |
|---|---|---|
| Example 16 | 96 | Good |
| Example 17 | 95 | Good |
| Example 18 | 94 | Good |

As seen from Table 7 and 8, in the cell of example 16 up to 18, the negative electrode presents good condition even immediately after sintering and after charge discharge cycles to give good electrical characteristics.

From aforementioned facts, when sheet metal thickness T, mesh long width center distance LW, mesh short width center distance SW, mesh long width max. opening a, mesh short width max. opening b may satisfy predetermined conditions, any of the material of expanded metal can be applicable. However, as to this cell, as electrolyte salt lithium salt is used, it is required that a metal, which does not form any alloy with lithium, should be selected. Also, it is preferable that copper mesh or nickel mesh should be used as negative electrode, because of the requirement to lower cell inner electrical resistance and of the higher melting temperature, as in the case of example 16 or 17.

EXAMPLE 19–23

Except for modification of negative electrode composite sintered body thickness T, the number of negative composite sintering body and positive electrode as shown in Table 9, cell is processed as in the case of example 1 to be completed as square type. However, the profile of copper mesh is as follows.

Sheet metal thickness T : 0.1 mm

Mesh long width center distance LW : 1.5 mm

Mesh short width center distance SW : 0.75 mm

Mesh long width max. opening a : 1.35 mm

Mesh short width max. opening b : 0.60 mm

COMPARATIVE EXAMPLE 9, 10

As shown in Table 9, the thickness of negative electrode sintered composite body and the number of positive electrode are modified. That is to say, except in the case, wherein the thickness of negative electrode sintered body was excluded from prescription, the cell is made by the process as in the case of example 1 as square type cell. However, the profile of metal mesh is as follows.

Thickness of sheet metal T : 0.1 mm

Mesh long width center distance LW : 1.5 mm

Mesh short width center distance SW : 0.75

Mesh long width max. Opening a : 1.35 mm

Mesh short width max. Opening b : 0.60 mm

Evaluation is made on produced cells on cell inner electrical resistance, discharge capacity, capacity maintaining rate, and change of electrode appearance after the cycles of charging and discharging. Table 10 shows the result.

TABLE 9

|  | Outer Negative Electrode | | Inner Negative Electrode | |
| --- | --- | --- | --- | --- |
|  | Number | Thickness (mm) | Number | Thickness (mm) |
| Example 19 | 2 | 0.75 | 1 | 1.5 |
| Example 20 | 2 | 0.32 | 3 | 0.64 |
| Example 21 | 2 | 0.22 | 5 | 0.43 |
| Example 22 | 2 | 0.16 | 7 | 0.32 |
| Example 23 | 2 | 0.10 | 12 | 0.20 |
| Comparative Example 9 | 2 | 2.5 | 0 | — |
| Comparative Example 10 | 2 | 0.09 | 14 | 0.18 |

|  | Positive Electrode | |
| --- | --- | --- |
|  | Number | Thickness (mm) |
| Example 19 | 2 | 1.9 |
| Example 20 | 4 | 0.80 |
| Example 21 | 6 | 0.53 |
| Example 22 | 8 | 0.40 |
| Example 23 | 13 | 0.24 |
| Comparative Example 9 | 1 | 3.3 |
| Comparative Example 10 | 15 | 0.21 |

TABLE 10

|  | Electrode Appearance (After Sintering) | Cell Inner Electrical Resistance (mΩ) | 200 mA Discharge Capacity (mAh) |
| --- | --- | --- | --- |
| Example 19 | Good | 120 | 1100 |
| Example 20 | Good | 60 | 960 |
| Example 21 | Good | 40 | 895 |
| Example 22 | Good | 35 | 875 |
| Example 23 | Good | 30 | 800 |
| Comparative Example 9 | Good | 240 | 1005 |
| Comparative Example 10 | Cracked | 20 | 770 |

|  | 400 mA Discharge Capacity (mAh) | Capacity Maintain Rate after 50 cycles (%) | Electrode Appearance (After 50 cycles) |
| --- | --- | --- | --- |
| Example 19 | 770 | 89 | Good |
| Example 20 | 860 | 96 | Good |
| Example 21 | 830 | 96 | Good |
| Example 22 | 830 | 96 | Good |
| Example 23 | 770 | 96 | Good |
| Comparative Example 9 | 650 | 84 | Good |
| Comparative Example 10 | 750 | 88 | Cracked |

As shown in Table 9 and Table 10, in the cell of the Examples 19–23, wherein the thickness of negative electrode sintered body was specified 0.2 up to 1.5 mm, immediately after sintering and after the 50 times charge and discharge cycles, the negative electrode maintained good profile to maintain good cell characteristics.

Notwithstanding, in case of the negative electrode with thickness exceeding 1.5 mm (comparative example 9), cell inner resistance was increased remarkably.

When the thickness of negative electrode sintered body is lower than 0.2 mm (comparative example 10), so the electrode strength is insufficient, cracking of the sintered body upon cell assembly or by the shrinkage upon carbon layer sintering and upon the expansion and shrinkage upon the cycles of charge and discharge was observed.

For this reason, in order to control cell inner resistance to a low level and to give electrode a sufficient strength, it is preferable the thickness of negative electrode be specified to 0.2 up to 1.5 mm.

In this embodiment, as the carbonaceous material for negative electrode mesophase carbon was used. For positive electrode, $LiCoO_2$ was used. Similar results are obtainable, in the case to use another carbonaceous material for negative electrode and another transition metal composite oxide for positive electrode.

What is claimed is:

1. A non-aqueous electrolyte secondary cell comprising a negative electrode, a positive electrode and a non-aqueous electrolyte, said negative electrode comprising a composite anode of a sintered carbonaceous material disposed on an expanded metal mesh collector, said expanded metal mesh collector having a plurality of rhombic openings defined therein, said expanded metal mesh collector having a metal thickness, T, a center distance between openings in a longitudinal direction, LW, a center distance between openings in a shorter direction, SW, a maximum mesh opening length dimension in the longitudinal direction, a, and a maximum opening length dimension in the shorter direction, b, such that:

0.05 mm is $\leq T < 0.20$ mm;

$1.0 \leq (LW/SW) \leq 3.0$;

$0.5$ mm$^2 \leq (LW \times SW) \leq 12.5$ mm$^2$; and $0.43 \leq (a \times b)/(SW \times LW)$ which is $\leq 0.90$.

2. The non-aqueous electrolyte secondary cell of claim 1, wherein the expanded metal is characterized by being made of copper or nickel.

3. The non-aqueous electrolyte secondary cell of claim 1 wherein said sintered carbonaceous material is selected from the group consisting of graphite, non-graphitizable carbon, and graphitizable carbon.

4. The non-aqueous electrolyte secondary cell of claim 1, wherein said positive electrode includes an active cathode material comprising a composite oxide of the formula $Li_xMO_2$, wherein M is at least one transition metal and x is an atomic percentage and has a value such that $0.05 \leq x \leq 1.10$.

5. The non-aqueous electrolyte secondary cell of claim 1, wherein said non-aqueous electrolyte comprises a mixture of a cyclic ester organic solvent and a chain ester organic solvent.

6. The non-aqueous electrolyte secondary cell of claim 5, wherein said cyclic ester organic solvent is selected from the group consisting of ethylene carbonate, propylene carbonate, butylene carbonate, vinylene carbonate, γ-butyrolactone, and sulforane.

7. The non-aqueous electrolyte secondary cell of claim 5, wherein said chain ester organic solvent is selected from the group consisting of 1,2-dimethoxyethane, 2-methyltetrahydrofuran, 3-methyl-1,3-dioxolane, methyl propionic acid, methyl butyric acid, dimethyl carbonate, diethyl carbonate, and dipropylene carbonate.

8. The non-aqueous electrolyte secondary cell of claim 1, wherein said non-aqueous electrolyte further comprises a lithium salt selected from the group consisting of lithium peroxide, lithium boride fluoride, lithium aluminate chloride, lithium halide, and lithium trifluoromethane sulfonic acid.

* * * * *